(12) United States Patent
Fenton et al.

(10) Patent No.: US 7,017,631 B2
(45) Date of Patent: Mar. 28, 2006

(54) FELLER BUNCHER

(76) Inventors: David Stanley Fenton, General Delivery, Grovedale, Alberta (CA) T0H 1X0; Barry David Fenton, General Delivery, Grovedale, Alberta (CA) T0H 1X0

( * ) Notice: Subject to any disclaimer, the term of this patent is extended or adjusted under 35 U.S.C. 154(b) by 30 days.

(21) Appl. No.: 10/720,367

(22) Filed: Nov. 24, 2003

(65) Prior Publication Data

US 2004/0211486 A1    Oct. 28, 2004

(30) Foreign Application Priority Data

Mar. 20, 2003  (CA) .................................. 2422987

(51) Int. Cl.
*A01G 23/08*   (2006.01)

(52) U.S. Cl. .................... 144/34.1; 144/4.1; 144/24.1

(58) Field of Classification Search ................ 144/4.1, 144/34.1, 24.12, 336, 334
See application file for complete search history.

(56) References Cited

U.S. PATENT DOCUMENTS

| | | | | |
|---|---|---|---|---|
| 3,183,949 A | * | 5/1965 | Larson | 144/24.13 |
| 4,446,897 A | | 5/1984 | Kurelek | 144/34.1 |
| 4,467,849 A | * | 8/1984 | Denis | 144/34.1 |
| 4,552,191 A | | 11/1985 | Kuusilinna | 144/4.1 |
| 4,909,291 A | * | 3/1990 | Tremblay | 144/34.1 |
| 5,161,588 A | * | 11/1992 | Hamilton | 144/34.1 |
| 5,441,090 A | | 8/1995 | Hill et al. | 144/4.1 |
| 5,671,788 A | * | 9/1997 | Rewis | 144/34.1 |
| 5,901,477 A | * | 5/1999 | Weaver | 37/302 |
| 5,975,166 A | * | 11/1999 | MacLennan | 144/4.1 |
| 6,152,201 A | * | 11/2000 | Kurelek | 144/336 |
| 6,186,198 B1 | * | 2/2001 | Holmes | 144/34.1 |
| 6,374,877 B1 | | 4/2002 | Wildey | 144/4.1 |
| 6,453,957 B1 | * | 9/2002 | Devaney | 144/34.1 |

* cited by examiner

*Primary Examiner*—Bena Miller
(74) *Attorney, Agent, or Firm*—Davis & Bujold, P.L.L.C.

(57) ABSTRACT

A feller buncher includes an elongate support having an axis, a first side, a second side, a first end and a second end. A first tree receiving cavity is positioned along the first side of the support. A second tree receiving cavity is positioned along the second side of the support. A circular saw is positioned at the second end of the support. The plane of the saw is transverse to the axis of the vertical support. Movable grapple arms are positioned on each of the first side and the second side of the support above the circular saw. The grapple arms are adapted to hold trees while they are being felled and then maintain bunches of felled trees in each of the first tree receiving cavity and the second tree receiving cavity.

2 Claims, 3 Drawing Sheets

FELLER BUNCHER

This application claims priority from Canadian Application Serial No. 2,422,987 filed Mar. 20, 2003.

FIELD OF THE INVENTION

The present invention relates to a feller buncher used in the logging industry to fell and then simultaneously bunch together trees.

BACKGROUND OF THE INVENTION

U.S. Pat. No. 5,975,166 (MacLennan 1999) and U.S. Pat. No. 6,374,877 (Wildey 2002) are examples of feller bunchers.

Each of these feller bunchers has an elongate support. A saw is positioned at a bottom of the support, with the plane of the saw transverse to the axis of the support. Grapples are positioned above the saw. The grapples hold individual trees as they are being felled and hold several felled trees against the support to form a bunch.

SUMMARY OF THE INVENTION

The present invention relates to a new configuration of feller buncher which has some functional advantages over existing feller buncher configurations.

According to the present invention there is provided a feller buncher which includes an elongate support having an axis, a first side, a second side, a first end and a second end. A first tree receiving cavity is positioned along the first side of the support. A second tree receiving cavity is positioned along the second side of the support. A circular saw is positioned at the second end of the support. The plane of the saw is transverse to the axis of the vertical support. Movable grapple arms are positioned on each of the first side and the second side of the support above the circular saw. The grapple arms are adapted to hold trees while they are being felled and then maintain bunches of felled trees in each of the first tree receiving cavity and the second tree receiving cavity.

The innovation of having a first tree receiving cavity along the first side of the support and a second tree receiving cavity along the second side of the support, provides a number of advantages. One advantage is that trees may be more readily felled from either the first side or the second side of the feller buncher. Another advantage relates to the operation of the circular saw. Having two tree receiving cavities results in two sides of the circular saw being used, rather than just the center area of the saw. This serves to double the capacity of the saw. It also enables a smaller diameter of saw blade to be used.

Although beneficial results may be obtained through the use of the feller buncher, as described above, even more beneficial results may be obtained when a rigid horn is centrally positioned between the first tree receiving cavity and the second tree receiving cavity adjacent to the second end of the support. The rigid horn projects outwardly from the support and can be used for such tasks as clearing debris or lining up logs in a pile.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
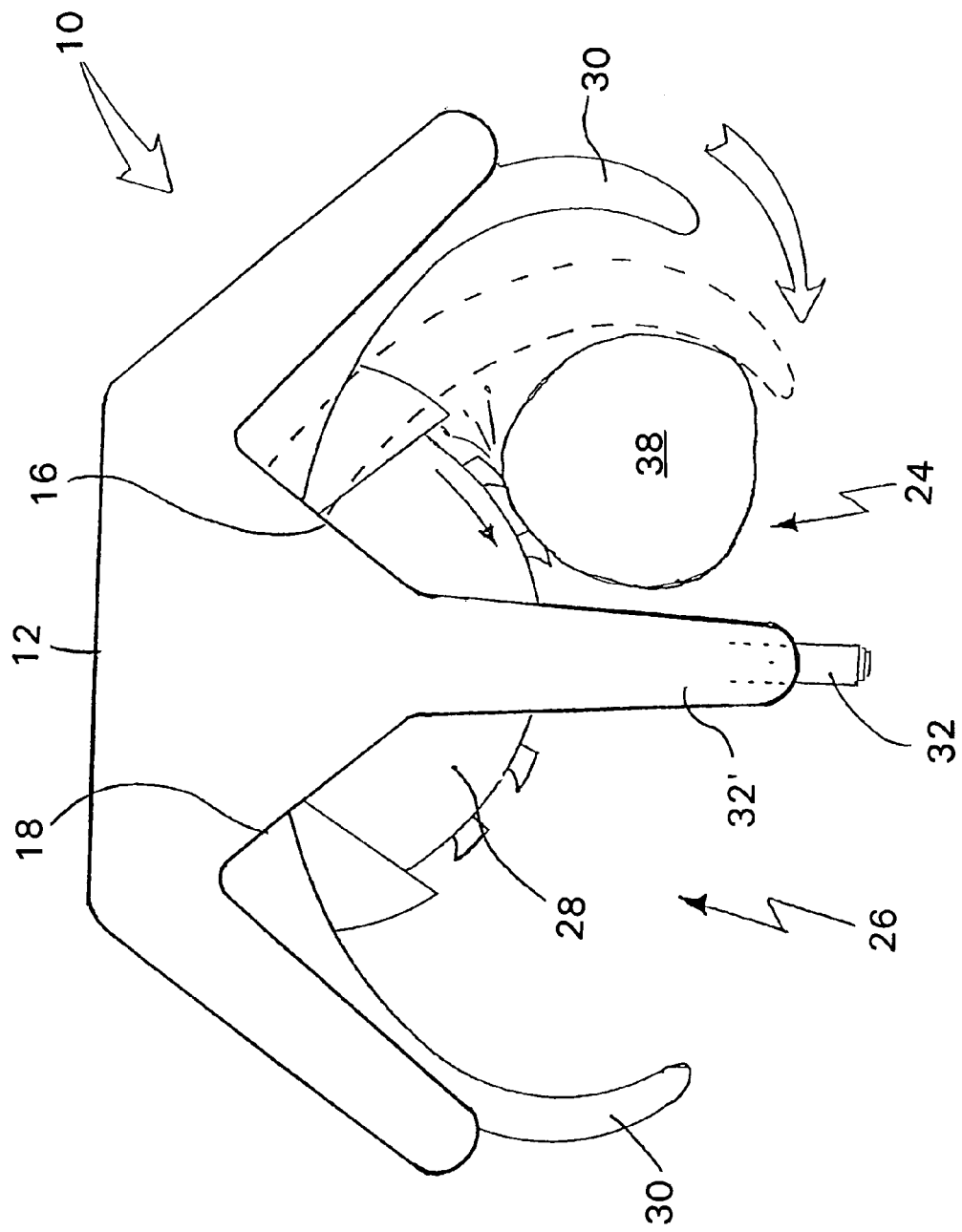
FIG. 2 is a top plan view of the feller buncher illustrated in FIG. 1, in the process of felling a tree.
Figure 3:
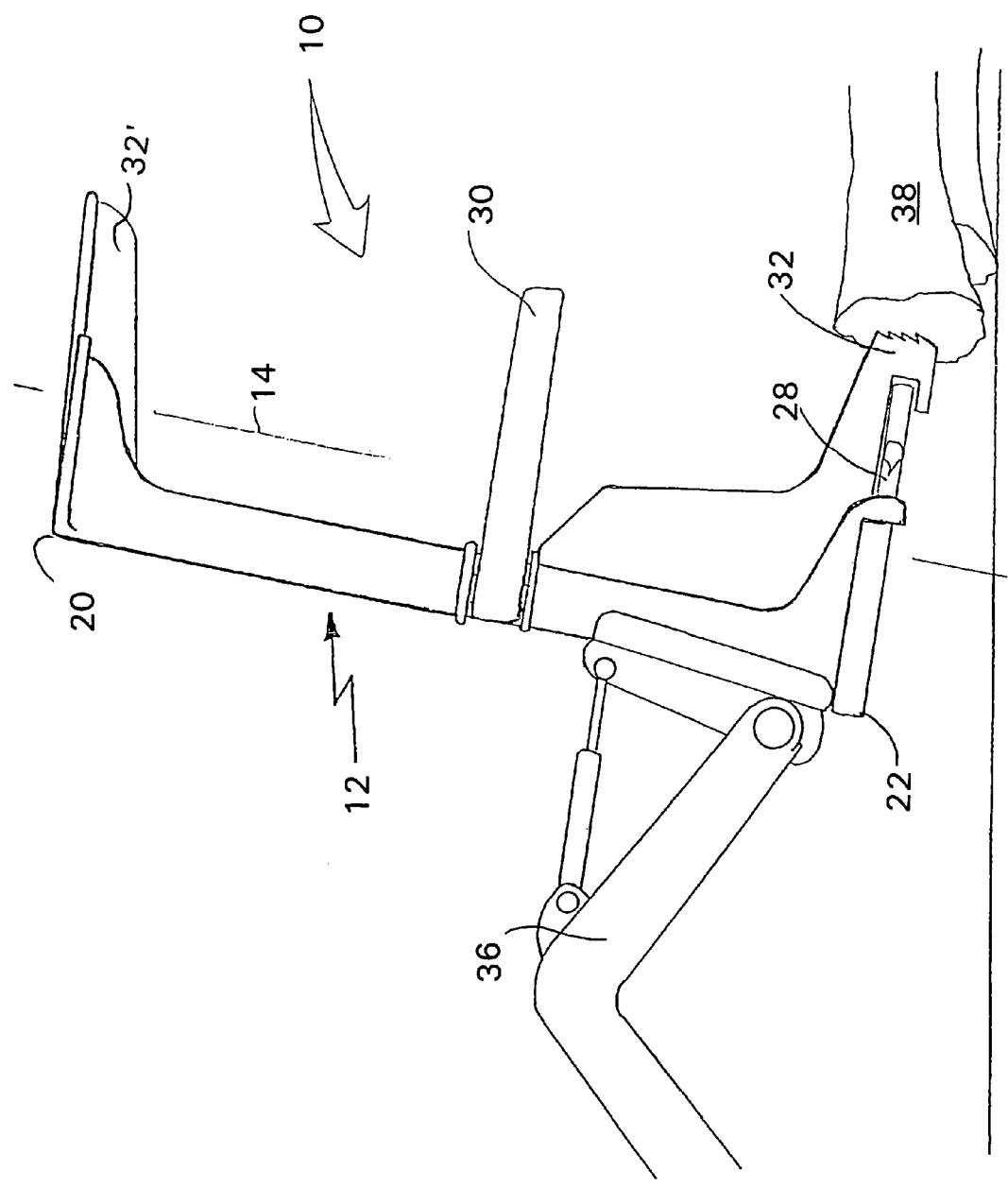
FIG. 3 is a side elevation view of the feller buncher illustrated in FIG. 1, in the process of using the horn to line up logs in a pile.

The preferred embodiment, a feller buncher generally identified by reference numeral 10, will now be described with reference to FIGS. 1 through 3.

Figure 1:
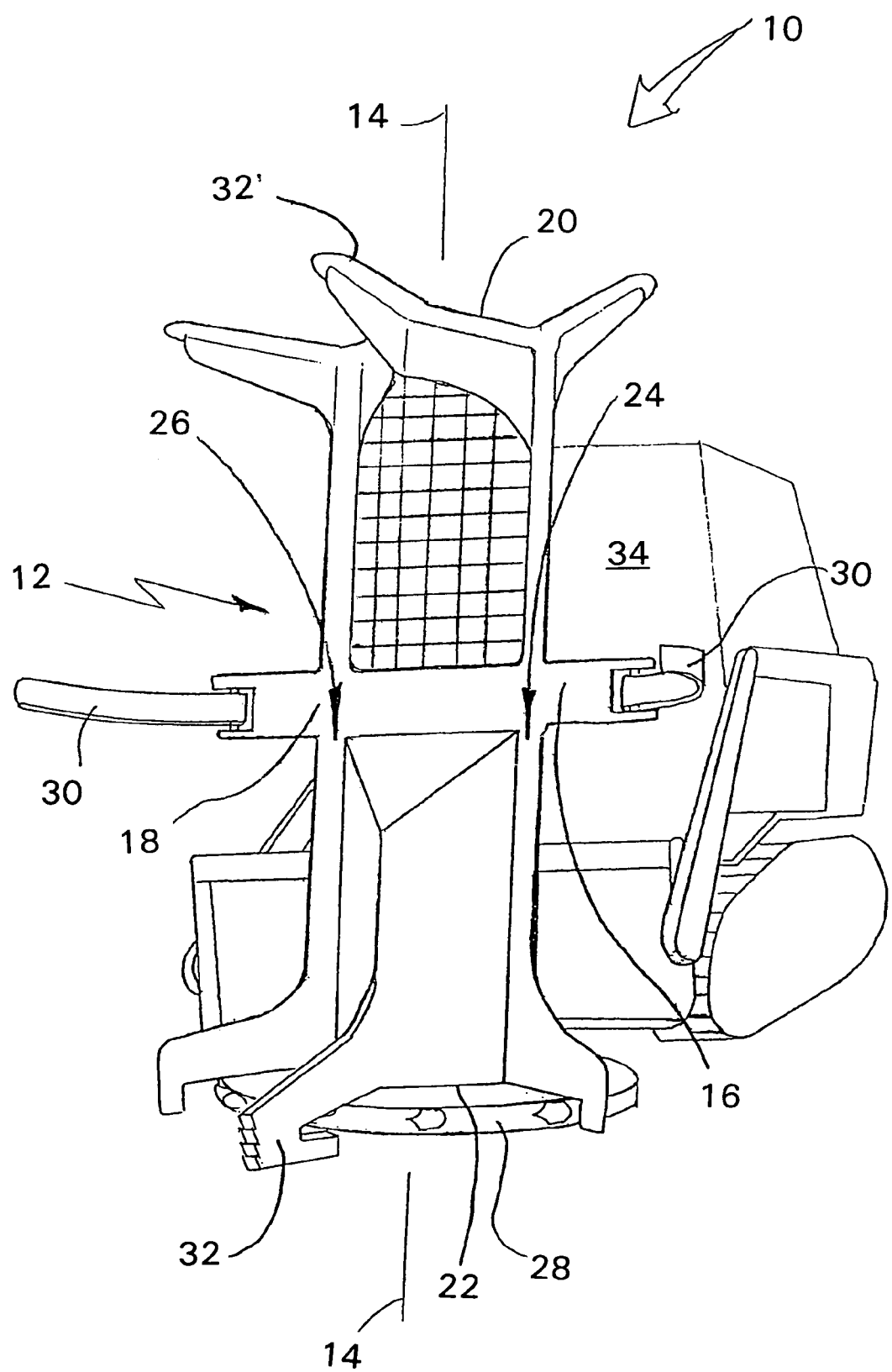
FIG. 1 is a perspective view of a feller buncher constructed in accordance with the teachings of the present invention.

Structure and Relationship of Parts:

Referring to FIG. 1, feller buncher 10 includes an elongate support 12 having an axis 14, a first side 16, a second side 18, a first end 20 and a second end 22. Referring to FIG. 2, a first tree receiving cavity 24 is positioned along first side 16. A second tree receiving cavity 26 is positioned along second side 18. Referring to FIG. 1, a circular saw 28 is positioned at second end 22 of elongate support 12 such that the plane of circular saw 28 is in transverse relation to axis 14. Moveable grapple arms 30 are positioned on each of first side 16 and second side 18, above circular saw 28. Elongate support is further adapted with a rigid horn (divider) 32 positioned adjacent to second end 22, a second divider 32'is positioned adjacent the first end 20. Referring to FIG. 2, rigid horn 32 is centrally positioned between first tree receiving cavity 24 and second tree receiving cavity 26. Although not part of the inventive concept, referring to FIG. 1, feller buncher is shown attached to a tractor 34 by way of hydraulic arms 36 as illustrated in FIG. 3. Referring to FIGS. 2 and 3, trees 38 are illustrated.

Operation:

The use and operation of feller buncher 10 will now be described with reference to FIGS. 1 through 3. Referring to FIG. 1, in the illustrated embodiment, tractor 34 transports and manipulates feller buncher 10. It will be appreciated that other means of transport and manipulation may be used. Referring to FIG. 2, a user may position either first tree receiving cavity 24 or second tree receiving cavity 26 such that circular saw 28 engages a tree 38. The selection of which of first tree receiving cavity 26 or second tree receiving cavity 28 is used is based upon the best opportunity and orientation that the user may come upon to fell a tree. In the illustrated embodiment, tree 38 is positioned within first tree receiving cavity 24. Once positioned, moveable grapple arms 30 enclose (as shown in dotted lines) tree 38 in receiving cavity 24, grasping and holding tree 38 while circular saw 28 cuts it. Once cutting is finished, tree 38 continues to be held by moveable grapple arms 30, as feller buncher 10 is positioned and manipulated by tractor 34 to cut other trees until a bunch of trees has been accumulated. The bunches of trees may then be left in a pile. Referring to FIG. 3, rigid horn 32 may be projected into a pile of trees 38 in order to sort them and arrange them in piles.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A feller buncher, comprising:
   an elongate support having an axis, a first side, a second side, a first end and a second end;
   a first tree receiving cavity positioned along the first side of the support;
   a second tree receiving cavity positioned along the second side of the support;
   the first tree receiving cavity and the second tree receiving cavity being formed by a first divider at the first end of the support and a second divider at the second end of the support;
   a circular saw positioned at the second end of the support, the plane of the saw being transverse to the axis of the vertical support; and
   movable grapple arms shared by the first tree receiving cavity and the second tree receiving cavity, the grapple arms being positioned on each of the first side and the second side of the support above the circular saw, the grapple arms being adapted to hold trees while they are being felled and then maintain bunches of felled trees in each of the first tree receiving cavity and the second tree receiving cavity.

2. A feller buncher, comprising:
   an elongate support having an axis, a first side, a second side, a first end and a second end;
   a first tree receiving cavity positioned along the first side of the support;
   a second tree receiving cavity positioned along the second side of the support;
   a circular saw positioned at the second end of the support, the plane of the saw being transverse to the axis of the vertical support;
   movable grapple arms positioned on each of the first side and the second side of the support above the circular saw, the grapple arms being adapted to hold trees while they are being felled and then maintain bunches of felled trees in each of the first tree receiving cavity and the second tree receiving cavity; and
   a rigid horn centrally positioned between the first tree receiving cavity and the second tree receiving cavity adjacent to the second end of the support, and the rigid horn projecting outwardly from the support.

* * * * *